(12) United States Patent
Schweizer

(10) Patent No.: US 7,201,439 B2
(45) Date of Patent: Apr. 10, 2007

(54) PASSENGER SEAT, AN AIRCRAFT PASSENGER SEAT IN PARTICULAR

(75) Inventor: Oliver Schweizer, Lindenberg (DE)

(73) Assignee: Recaro Aircraft Seating GmbH & Co. KG, Schwäbisch Hall (DE)

( * ) Notice: Subject to any disclaimer, the term of this patent is extended or adjusted under 35 U.S.C. 154(b) by 0 days.

(21) Appl. No.: 11/130,411

(22) Filed: May 17, 2005

(65) Prior Publication Data

US 2005/0258672 A1 Nov. 24, 2005

(30) Foreign Application Priority Data

May 18, 2004 (DE) .................. 10 2004 024 559

(51) Int. Cl.
*B60N 83/02* (2006.01)
(52) U.S. Cl. .................. 297/145; 108/38; 108/40
(58) Field of Classification Search ............... 297/145, 297/146, 155; 108/44–46, 40, 38
See application file for complete search history.

(56) References Cited

U.S. PATENT DOCUMENTS

| 69,799 | A | * | 10/1867 | Greene | 297/145 |
| 2,168,210 | A | * | 8/1939 | Hawksley | 108/38 |
| 2,330,627 | A | * | 9/1943 | Reynolds | 297/145 |
| 2,845,113 | A | * | 7/1958 | Keel | 297/145 |
| 3,583,760 | A | * | 6/1971 | McGregor | 297/145 |
| 3,632,161 | A | * | 1/1972 | Arfaras et al. | 297/145 |
| 5,050,929 | A | * | 9/1991 | Gueringer et al. | 297/145 |
| 5,927,799 | A | * | 7/1999 | Tornero | 297/145 |
| 5,951,128 | A | * | 9/1999 | Aidone et al. | 108/44 |

FOREIGN PATENT DOCUMENTS

| DE | 100 27 230 | 12/2001 |
| GB | 667 894 | 3/1952 |

* cited by examiner

*Primary Examiner*—Peter R. Brown
(74) *Attorney, Agent, or Firm*—Roylance, Abrams, Berdo, & Goodman, L.L.P.

(57) ABSTRACT

A passenger seat, an aircraft passenger seat in particular, has seat components such as a back rest, a seat component, at least one console component delimiting the seat component on the side, and a table top (9) adjustable to an initial position and a use position. The console component has an interior compartment in which the table top (9) may be displaced in a guide (1) between the lowered initial position and a ready position when extracted from the upper end of the console component along the plane of the table top. At the upper end of the guide (1), a bearing configuration (19, 21, 25, 27) functions as support of the table top (9) and permits pivoting of the table top (9) from the ready position into the horizontal use position.

23 Claims, 5 Drawing Sheets

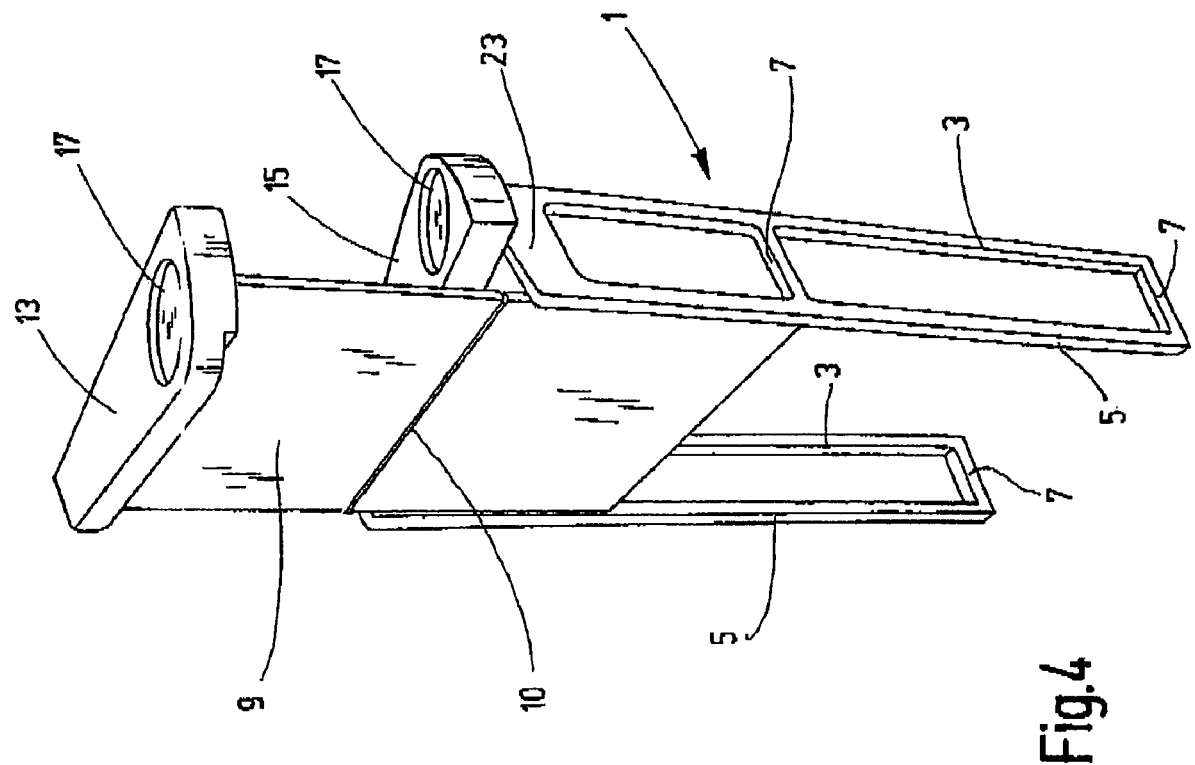
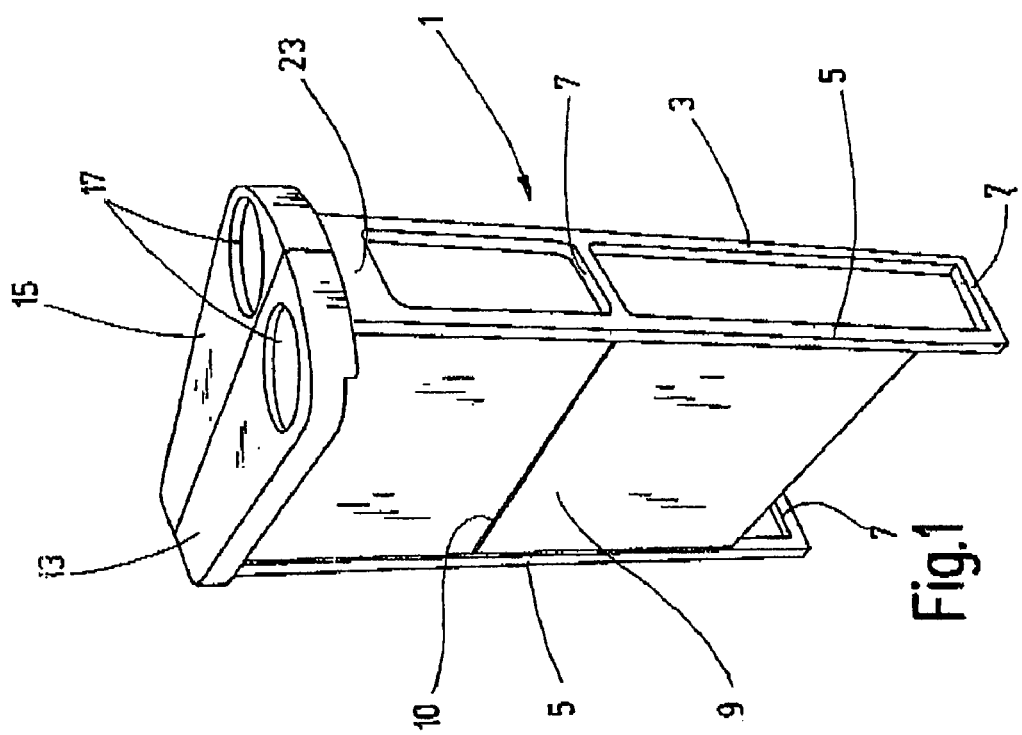

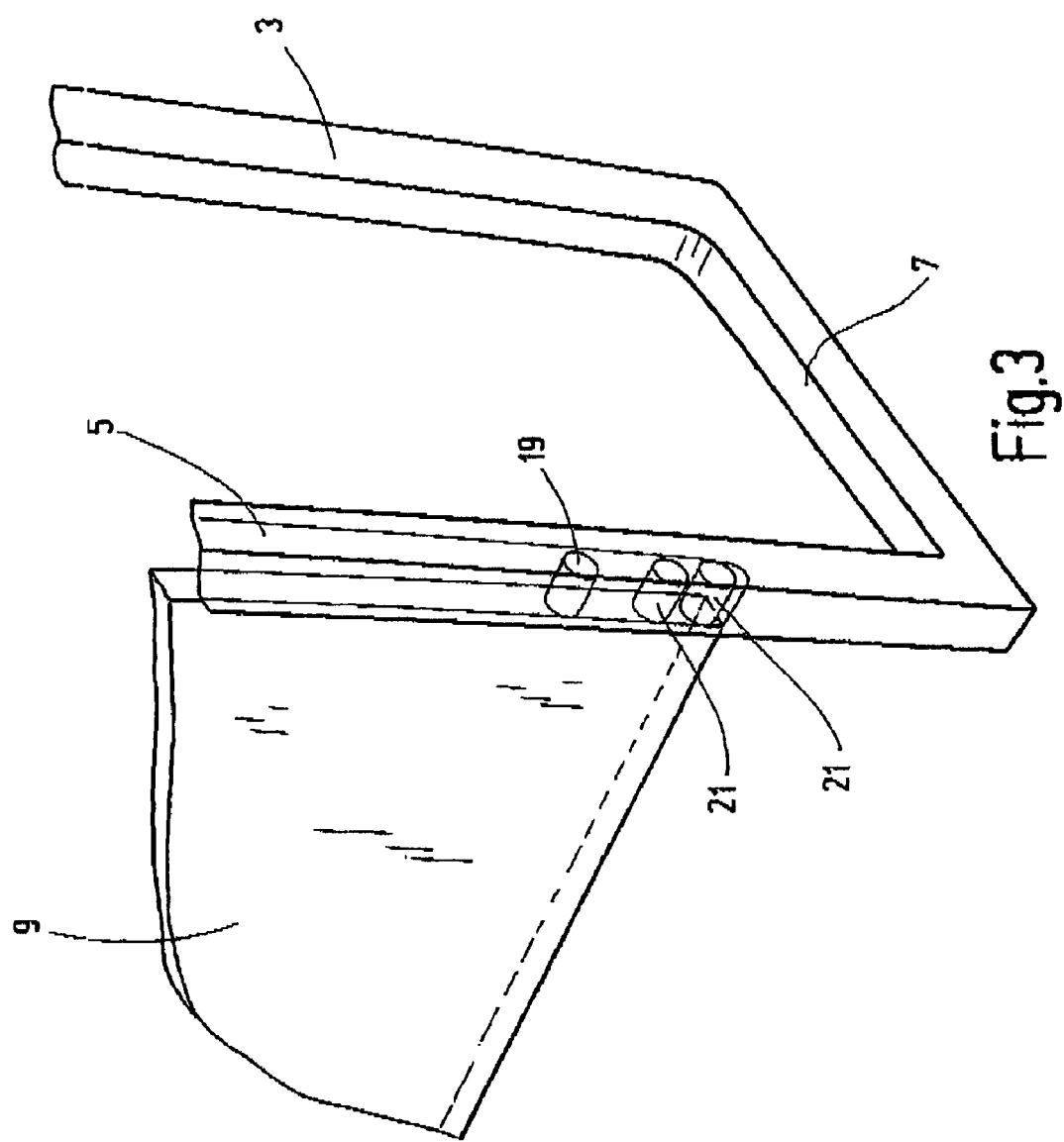
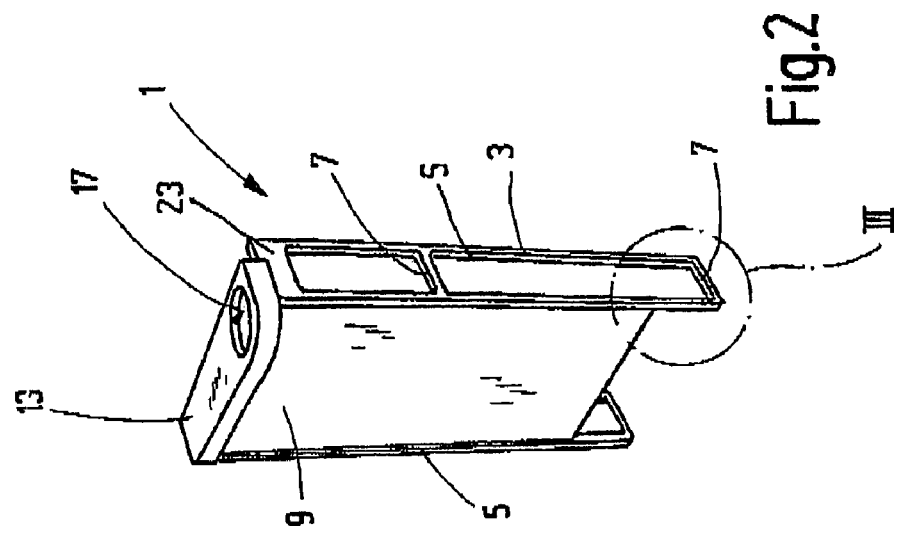

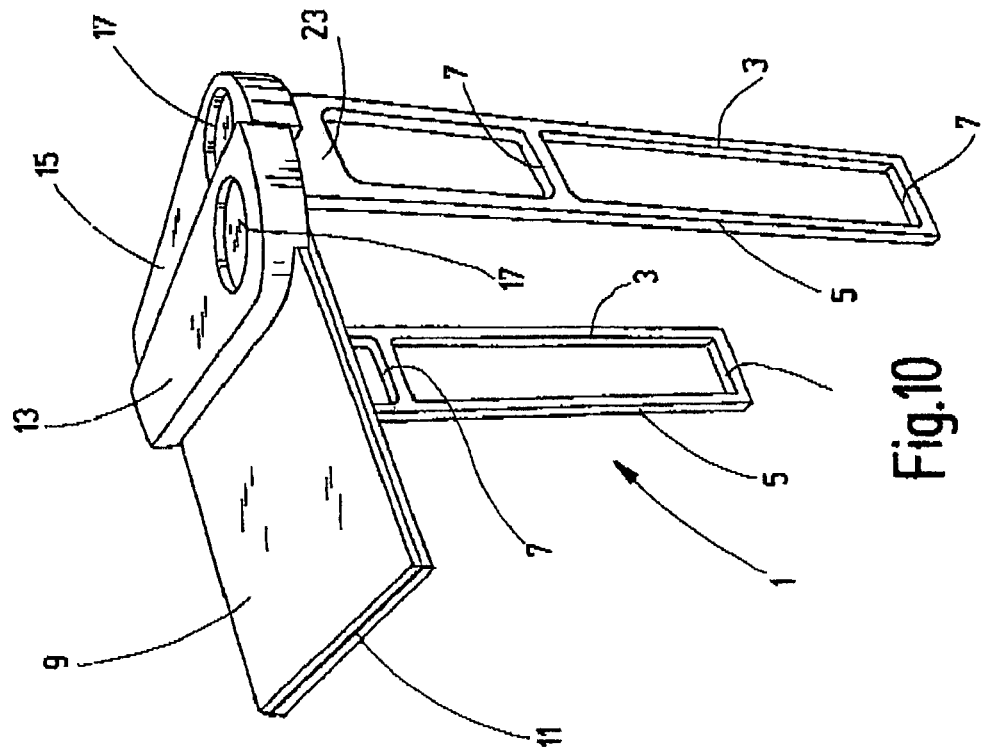
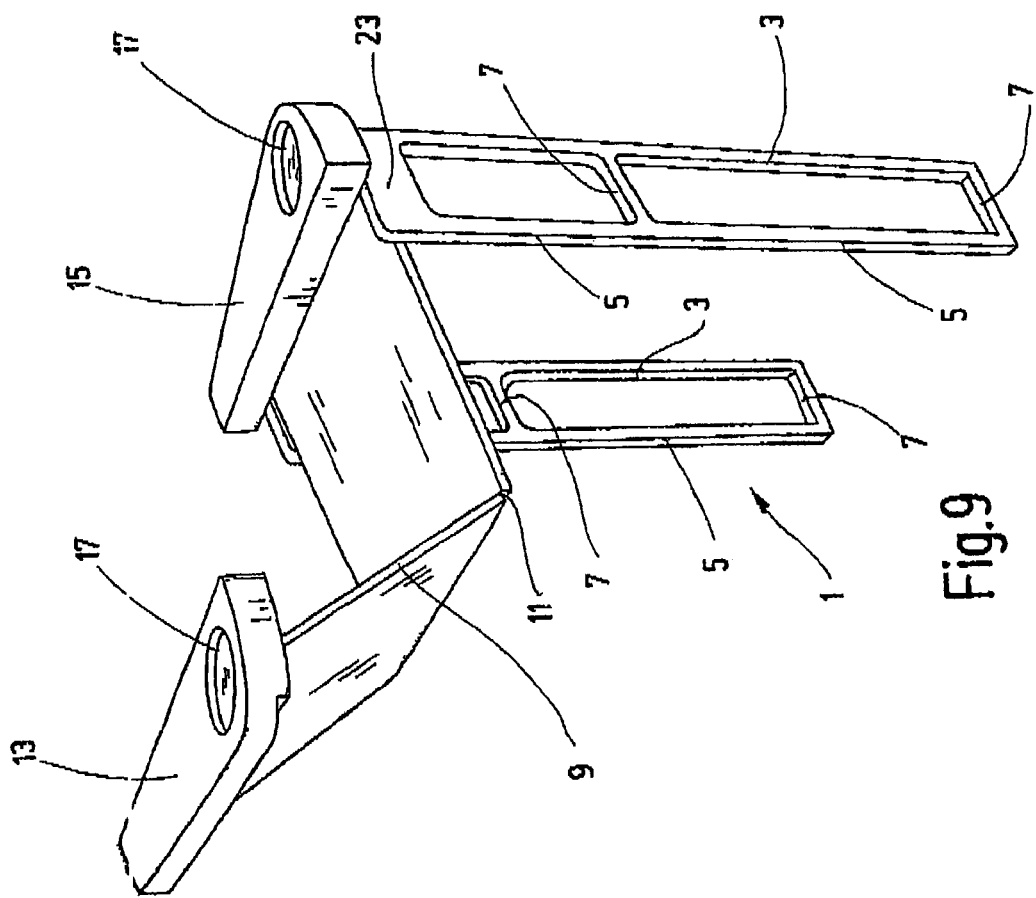

PASSENGER SEAT, AN AIRCRAFT PASSENGER SEAT IN PARTICULAR

FIELD OF THE INVENTION

The present invention relates to a passenger seat, an aircraft passenger seat in particular, having seat components such as a back rest and a seat component. At least one console component delimits the seat component on the side. A table top is adjustable between an initial position and a use position.

BACKGROUND OF THE INVENTION

Seats used in vehicles for transportation of passengers, especially in transportation for long travel distances and correspondingly long travel periods, have a table top available to a seat occupant for comfort. In ferries, interurban buses, and especially in aircraft passenger seats in commercial aviation, a table surface is made available for meals and beverages to the seat occupant as passenger refreshment, and for depositing items or as a work surface for reading, writing, games, and the like.

On the other hand, an effort is to be made in transportation for commercial passenger transportation to achieve optimum utilization of the cabin space available for installation of seats. Consequently, a configuration is required for the seats which is both as space-saving as possible, while affording the seat occupant the greatest possible comfort.

SUMMARY OF THE INVENTION

Objects of the present invention are to provide a passenger seat, an aircraft passenger seat in particular, which, despite its compact configuration and correspondingly small space required for the interior of the cabin involved, makes available to the seat occupant a table top configured to be large enough to be conveniently used by the seat occupant.

These objects are attained according to the present invention by a seat having a table top that may be lowered into the interior compartment of a console component positioned on the side of the seat component. Structural space already available in the overall structure of the seat and represented by the interior of the console component is used to accommodate the table top in the initial position, that is, in the non-use position. Since the entire vertical dimension of the console component is available for the length of the compartment and the compartment may be designed to be wide enough, a large table surface may be obtained for the table top in an especially advantageous manner without the need for sacrificing the compactness of the seat as a whole.

In one advantageous embodiment, on the end of the table top positioned at the upper end of the console component when in the initial position, a small auxiliary table in the initial position forms a cover of the top of the compartment and at least a part of an arm rest on the console component. When the table top is fully lowered, a closed upper side of the console component is obtained, along with an additional useful area, for example, a surface for depositing small objects such as beverage containers, and/or an arm rest. It is optionally in the form of an additional component which supplements an arm rest on the upper part of the console component.

In exemplary embodiments in which the bearing configuration for pivoting of the table top has pivot mounting pins projecting laterally to define the pivot axis for the pivoting movement of the table top, the pivot mounting pins may be mounted such that the pivot axis is at a distance from the associated end of the table top. The amount selected for this distance may be such that, when the table top is in the horizontal use position, its end area covers the upper end of the compartment in the console component, so that the console component has a closed form on the upper end even when the table top is in the use position. The plane of an arm initially positioned beside the compartment optionally moves into the plane of the horizontal table top without a shoulder.

The pivot pins of the table top may form a part of the guide elements provided on the table top. The elements operate in conjunction with the guide present in the compartment.

In one especially advantageous exemplary embodiment, the bearing configuration connecting the end of the table top to the console component forms, at the upper end of the guide, a bearing seat for each pivot pin. The pivot axes may be inserted into the bearing seat by movement transversely to the direction of the guide and longitudinal in relation to the plane of the table top. The pivot pins, and accordingly the table top, are then secured against movement along the guide.

To generate movement of insertion of the bearing pins into the bearing seat, the bearing configuration may have control surfaces at the upper end of the guide. In conjunction with at least one control element on the table top, the control surfaces form a forced guidance to convert the pivoting movement of the table top to transverse movement of the table top for guiding for insertion of the pivot pin into the respective associate bearing seat. It is advantageous for the process to include automatic locking of the end of the table top associated with the bearing configuration on the guide on the console component when the table top is moved from the ready position to the use position.

Control elements, like the pivot pins on the table top, the central surfaces are mounted on the side at a certain distance from the pivot pin involved and adjacent to the end of the table top. They are narrower than the table top and may form another part of the guide elements controlled in the guide.

In one advantageous exemplary embodiment, the guide has U-shaped profile rails extending on both sides of the table top in the direction of the compartment. Between its sides, the control elements projecting from both sides of the table top are guided.

As has already been stated, the depth and width of the compartment in the console component make it possible to design a table top of very large area. To make more free space or greater freedom of movement available to the seat occupant in instances in which a smaller table surface is sufficient, the table top may be divided, preferably to one-half of its area. Its parts may be folded by a hinge configuration. The auxiliary table, which is hinge-connected to the free end of the table top, may, when the latter is folded, form a usable table surface adjoining the service area of the arm rest. That is, it may perform a function similar to that of the auxiliary table when the table top is lowered into the initial position.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 1 is a perspective view of a simplified diagram of interior components of a console component according to an embodiment of the present invention, with the seat otherwise not shown, and with a guide, in an interior compartment of the console component, along which guide a divided table top having an auxiliary table mounted on the end so as to be movable, has an arm rest on the upper end;

FIG. 2 is a perspective view of the interior components, on a scale smaller, of FIG. 1, illustrating only the table top with auxiliary table completely lowered into the compartment of the console component (not shown);

FIG. 3 is an enlarged partial perspective view of the area III in FIG. 2;

FIG. 4 is a perspective view of the interior components similar to that of FIG. 1, but with the table top raised from its lowered position part of the way toward its extracted ready position;

FIG. 9 is a perspective view of the interior components, similar to that of FIG. 4, with the table top being illustrated in the use position and in the process of folding to reduce the table surface area; and FIG. 10 is a perspective view of the interior components similar to that of FIG. 9, with the table top being shown in the use position and completely folded.

DETAILED DESCRIPTION OF THE INVENTION

Figure 6:
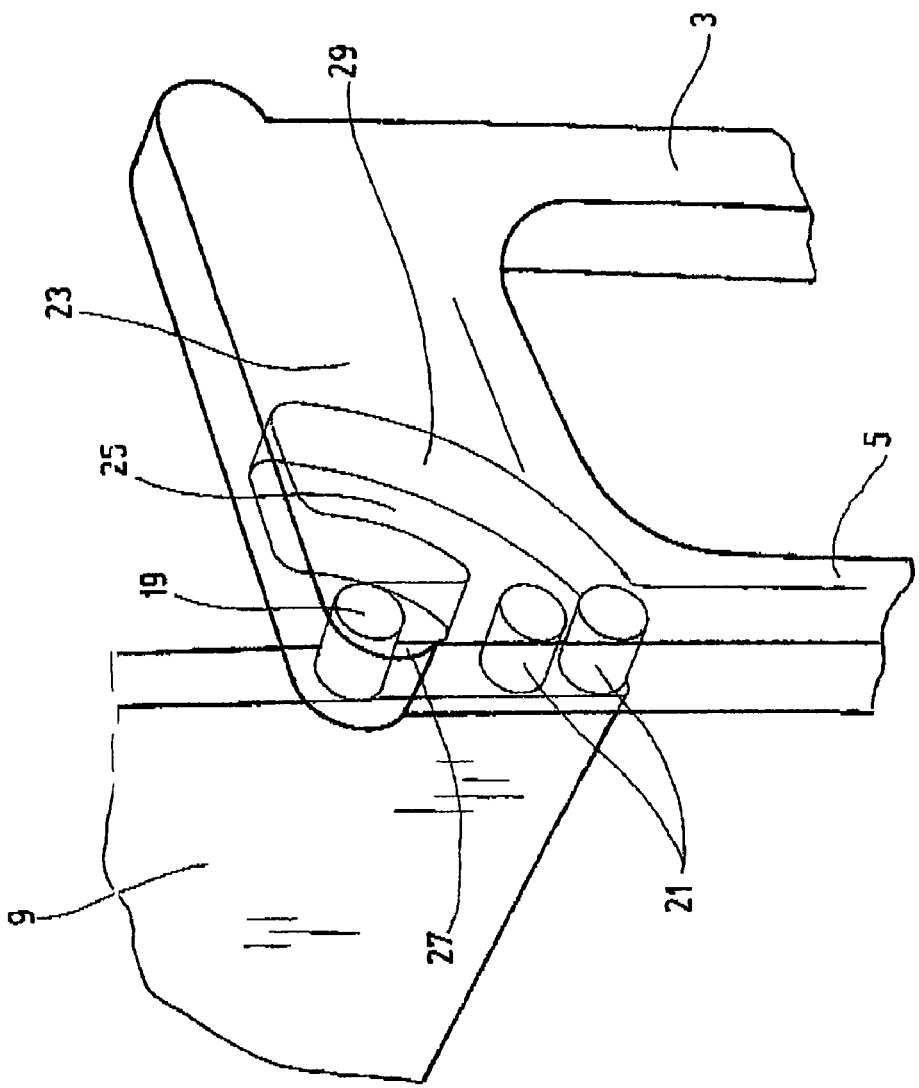
FIG. 6 is an enlarged partial perspective view of the area designated VI in FIG. 5.

In FIGS. 1–10, an example of an aircraft passenger seat according to an embodiment of the present invention, with only some structural components which are components of a console component forming the side limit of the seat component, is illustrated. The console component is shown without outer cover. This console component has a vertical interior compartment in which a guide 1 is mounted in the form of a metal frame support. The frame support has U-shaped profile rails 3 and 5 which extend vertically and in parallel with each other. Crossbeams 7 connect the U-shaped profile rails 3 and 5 to each other. A table top 9, divided in the middle 10, may be controlled to move longitudinally in the guide 1, more precisely along the U-shaped profile rails 5. The table top halves are connected to each other by a hinge 11. This hinge 11 is mounted in such a way that it permits pivoting movement of the outer table top component in only one direction, with the table top 9 in the extended position, as is to be seen in FIG. 7, for example, specifically, in the manner illustrated in FIGS. 9 and 10. That is, from the extended position to the folded position show in FIG. 10, the outer half of the table top 9 comes to rest above the inner table top half.

An auxiliary table 13, small in surface, is hinge-mounted on the free or outer end of the table top 9. In the initial position shown in FIG. 1, in which the table top 9 is fully lowered, the auxiliary table 13 is in a horizontal position and effects seamless transition to an arm rest 15 positioned at the top of the console component. In the present example, this arm rest 15 is the same in form as that of the auxiliary table 13. Auxiliary table 13 and arm rest 15 together form a useful surface or deposit surface with recesses 17 forming holders for beverage containers.

Figure 5:
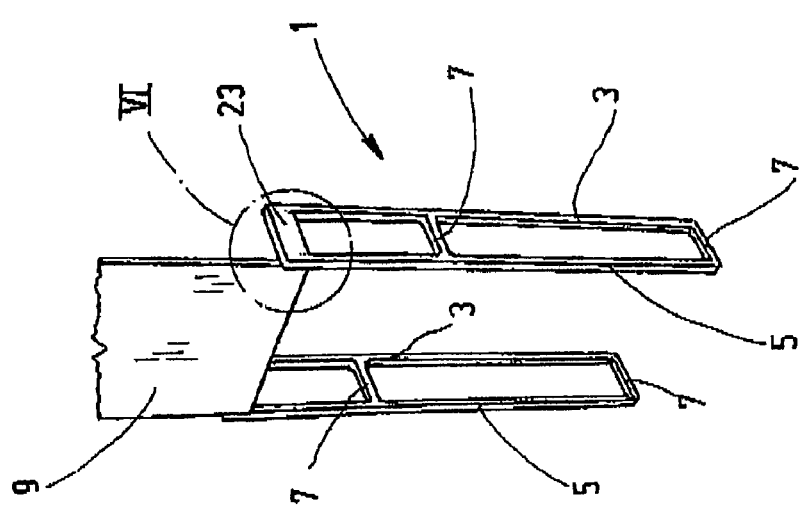
FIG. 5 is a perspective view of the interior components similar to that of FIG. 2 but on a small scale, with the table top, broken off and presented in the fully extracted ready position.

FIGS. 1 and 2 show the table top 9 in its fully lowered initial position or out-of-use position. FIG. 4 shows the table top 9 in the partly extracted position before reaching a fully extracted ready position. The fully extracted ready position is illustrated in FIGS. 5 and 6. As seen in FIGS. 3 and 6 in particular, laterally projecting elements are guided between the sides of the U-shaped profile rails 5. Only the element lying on a side edge of the table top 9 is shown.

The laterally projecting elements are positioned in the area of the lower end of the table top 9. The elements present on the opposite side edge are in a corresponding position, and are not seen. These elements guided in the U-shaped profile rails are in the form of a pair of pivot pins 19 spaced a certain distance from the adjacent end of the table top 9 (only one pivot pin 19 is to be seen on one side of the table top 9). Positioned nearer the end of the table top 9, closely adjacent control elements 21 of the same design are provided, one on each side of this table top. They as well are guided in the U-shaped profile rails S. The pivot pins 19 and the control elements 21 may be in the form of stationary pins or guide rollers.

FIG. 6 shows the table top 9 in the fully extracted ready position. The pivot pins 19 are positioned at the upper end of the guide of the profile rails S. This upper end of the U-shaped profile rails 5 being closed on both sides by top plates 23 (only one top plate 23 is visible on the side facing the observer). Top plate 23 connects the U-shaped profile rail S to the rear U-shaped profile rail 3. As is also to be seen in FIG. 9, in this ready position the control elements 21 are situated a vertical distance from the pivot pins 19 and in the entrance area of an arched profile section 25 configured in the top plate 23 and branching off from the U-shaped profile rails. At the same time, the pivot pins 19 are positioned at the level of a camber 27 on the upper end of the U-shaped profile rails 5. This camber 27 forms a bearing seat for the pivot pins 19, which bearing seat forms with the latter a pivot axis for pivoting of the table top 9 from the ready position into the horizontal use position.

Figure 8:
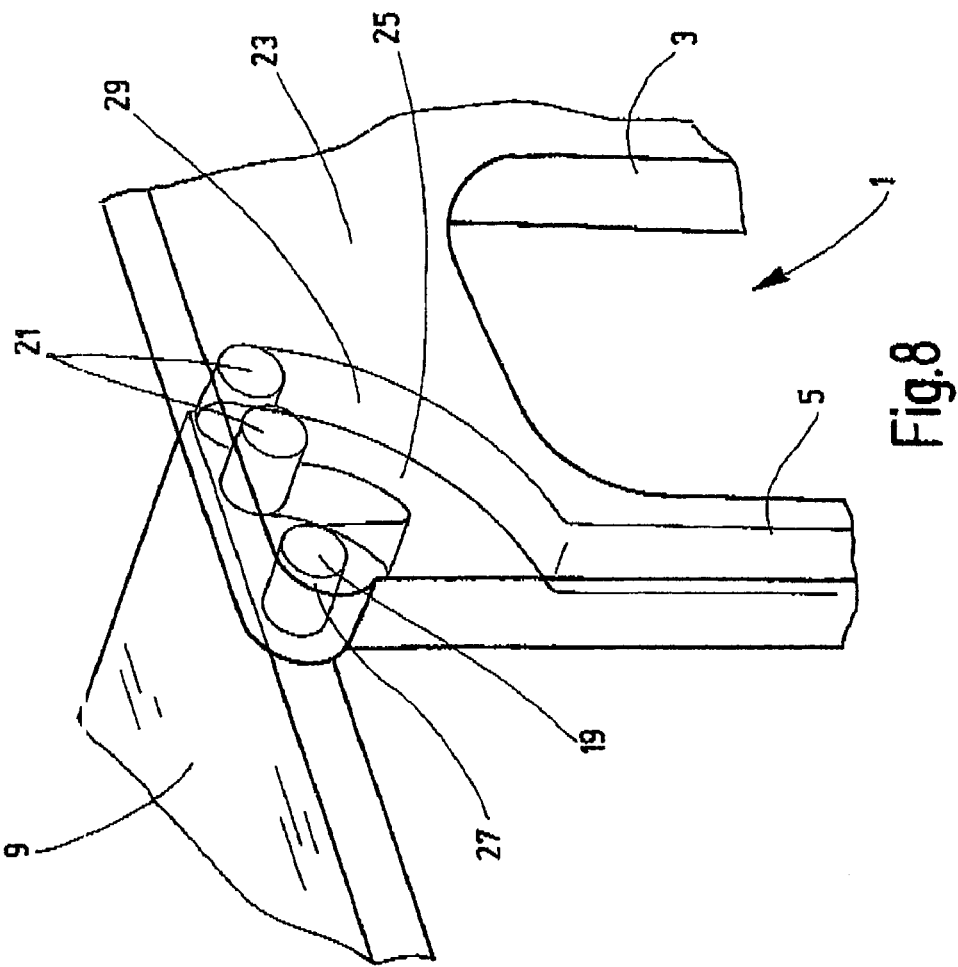
FIG. 8 is an enlarged partial view of the area designated VIII in FIG. 7.

As is shown by comparison of FIGS. 6 and 8, in this pivoting movement the control elements 21 move in the arched profile section 25 up to the upper closed end of the arched profile section (see FIG. 8). The curvature selected for the profile section 25 is such that movement of the control elements 21 in contact with the control surfaces 29 results in displacement of the table top 9 to the left in the direction of its plate level (as viewed in the direction of FIG. 8). As a result of this movement, the pivot pins reach the bearing seat formed by the camber 27, so that displacement of the pivot pins 19 downward along the U-shaped profile rails 5 is prevented. Since at the same time the control elements 21 are in contact with the upper end of the arched profile section 25, the table top 9 is blocked from further counterclockwise movement (as viewed in the direction of FIG. 8). If the table top 9 is pivoted from the horizontal use position clockwise upward back to the ready position, the control elements 21 move out of the cambered profile section 25. As a result of this movement, the table top 9 is released from the locked position, so that it may be moved back from the ready position to the lowered initial position.

Because of the distance between the pivot pins 19 and the adjacent end of the table top 9, in the use position the end area of the table top 9 extends over the upper area of the compartment to the arm rest 15 initially positioned on the upper end of the console component. Consequently, even when the table top 9 is in the use position, the upper opening of the compartment is closed by the end component of the table top 9 (see FIG. 9).

Figure 7:
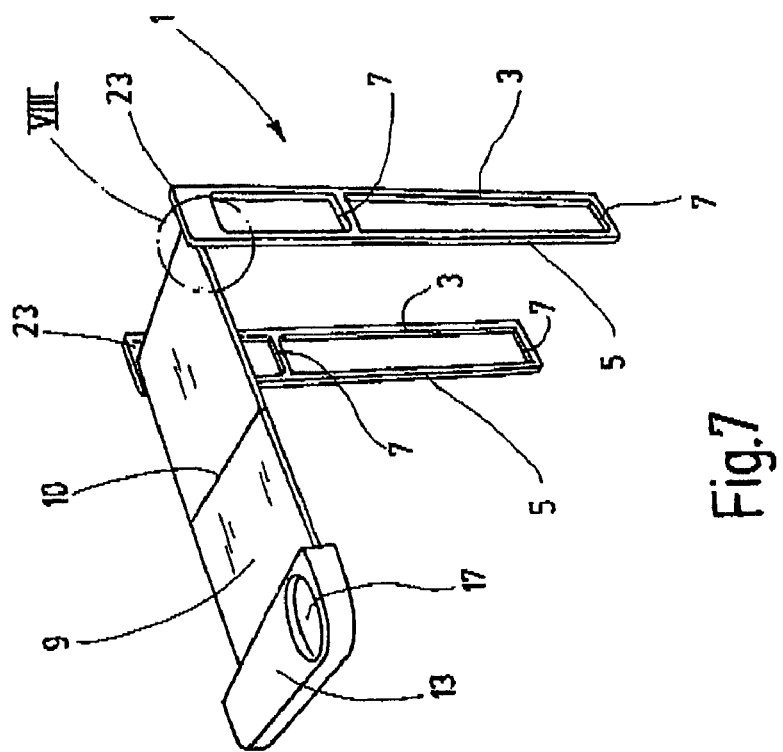
FIG. 7 is a perspective view of the interior components similar to that of FIGS. 2 and 5, on a small scale, with the table top being shown in the horizontal use position.

As FIG. 7 shows, the auxiliary table 13 lies on the top of the table top 9 when the latter is in the use position. The auxiliary table 13, because of its hinged connection with the table top 9 lies, when in the folded position shown in FIG. 10, on the lower side of the latter and adjoins the arm rest 15.

While one embodiment has been chosen to illustrate the invention, it will be understood by those skilled in the art that various changes and modifications can be made therein without departing from the scope of the invention as defined in the appended claims.

What is claimed is:

1. A passenger seat, comprising:
   a back rest;
   a seat component coupled to said back rest;
   at least one console component delimiting a side of said seat component and having an interior compartment with a guide;
   a table top adjustable between a lowered initial position within said interior compartment and a horizontal use position outside of said interior compartment by displacement in said guide between the lowered initial position and a ready position extracted from an upper end of said console component along a plane of said table top;
   a bearing at an upper end of said guide to support said table top and to permit pivoting movement of said table top from the ready position to the horizontal use position; and
   a small area auxiliary table on an upper end of said table top and at said upper end of said console component when said table top is in the initial position, said auxiliary table being hingedly connected to said table top and forming a cover on a top of said interior compartment and at least part of an arm rest when said table top is in the initial position.

2. A passenger seat according to claim 1 wherein said table top comprises a pivot pin on a side thereof; and said pivot pin defines a pivot axis with said bearing for the pivoted movement of said table top, and is positioned at a distance from an adjacent end of said table top.

3. A passenger seat according to claim 2 wherein said pivot pin is received within said guide to guide movement of said table top.

4. A passenger seat according to claim 3 wherein said bearing comprises a bearing seat receiving said pivot pin by movement of said table top in a direction transverse to a longitudinal direction of said guide and longitudinal relative to a plane of said table top preventing said pivot pin and said table top from moving along said guide when in the horizontal use position.

5. A passenger seat according to claim 4 wherein said upper end of said guide comprises control surfaces; and
   said table top comprises at least one control element received by said control surfaces to guide the pivoting movement of said table top and the movement in the transverse direction for introducing said pivot pin into said bearing seat.

6. A passenger seat according to claim 5 wherein said control element is mounted in said side of said table top at a distance from said pivot pin and at a distance closer to said adjacent end of said table top than said pivot pin, and is received in said guide to guide movement of said table top.

7. A passenger seat according to claim 6 wherein said guide comprises first and second U-shaped profile rails on opposite sides of said table top, each said side of said table top having said pivot pin and said control element projecting therefrom into the respective rail.

8. A passenger seat according to claim 7 wherein said bearing seat is formed at an upper end of each of said rail by a camber of a rail profile displaced relative to a longitudinal axis of the respective rail.

9. A passenger seat according to claim 8 wherein an arched profile section is displaced downwardly from said camber of each said rail, receives said control element on the respective side of said table top during the pivoting movement of said table top between the ready and use positions, and defines said control surfaces.

10. A passenger seat according to claim 9 wherein said control element on each said side of said table comprises two control members positioned side by side.

11. A passenger seat according to claim 10 wherein each said pivot pin and each said control number are of similar configurations.

12. A passenger seat according to claim 11 wherein each said pivot pin and each said control number is a guide roller.

13. A passenger seat according to claim 1 wherein said table top is divided into two table parts connected by a hinge permitting said table parts to be folded one over another; and
    said auxiliary table adjoins an arm rest surface when the table top is folded in the use position.

14. A passenger seat, comprising:
    a back rest;
    a seat component coupled to said back rest;
    at least one console component delimiting a side of said seat component and having an interior compartment with a guide;
    a table top adjustable between a lowered initial position within said interior compartment and a horizontal use position outside of said interior compartment by displacement in said guide between the lowered initial position and a ready position extracted from an upper end of said console component along a plane of said table top;
    a bearing at an upper end of said guide to support said table top and to permit pivoting movement of said table top from the ready position to the horizontal use position;
    a pivot pin on a side of said table top, said pivot pin defining a pivot axis with said bearing for the pivoted movement of said table top and being positioned at a distance from an adjacent end of said table top, said pivot pin being received within said guide to guide movement of said table top; and
    a bearing seat forming part of said bearing and receiving said pivot pin by movement of said table top in a direction transverse to a longitudinal direction of said guide and longitudinal relative to a plane of said table top preventing said pivot pin and said table top from moving along said guide when in the horizontal use position.

15. A passenger seat according to claim 14 wherein
said upper end of said guide comprises control surfaces; and
said table top comprises at least one control element received by said control surfaces to guide the pivoting movement of said table top and the movement in the transverse direction for introducing said pivot pin into said bearing seat.

16. A passenger seat according to claim 15 wherein
said control element is mounted in said side of said table top at a distance from said pivot pin and at a distance closer to said adjacent end of said table top than said pivot pin, and is received in said guide to guide movement of said table top.

17. A passenger seat according to claim 16 wherein
said guide comprises first and second U-shaped profile rails on opposite sides of said table top, each said side of said table top having said pivot pin and said control element projecting therefrom into the respective rail.

18. A passenger seat according to claim 17 wherein
said bearing seat is formed at an upper end of each of said rail by a camber of a rail profile displaced relative to a longitudinal axis of the respective rail.

19. A passenger seat according to claim 18 wherein
an arched profile section is displaced downwardly from said camber of each said rail, receives said control element on the respective side of said table top during the pivoting movement of said table top between the ready and use positions, and defines said control surfaces.

20. A passenger seat according to claim 19 wherein
said control element on each said side of said table comprises two control members positioned side by side.

21. A passenger seat according to claim 20 wherein
each said pivot pin and each said control number are of similar configurations.

22. A passenger seat according to claim 14 wherein
each said pivot pin and each said control number is a guide roller.

23. A passenger seat according to claim 14 wherein
said table top is divided into two table parts connected by a hinge permitting said table parts to be folded one over another.

* * * * *